United States Patent [19]

Matsui

[11] 4,165,774
[45] Aug. 28, 1979

[54] DEVICE FOR PREVENTING TIRES FROM SLIPPING
[75] Inventor: Kazuhiro Matsui, Toyoake, Japan
[73] Assignee: Masaharu Hutamura, Nagoya, Japan; a part interest
[21] Appl. No.: 789,155
[22] Filed: Apr. 20, 1977
[51] Int. Cl.² ............................................. B60C 27/20
[52] U.S. Cl. ...................................... 152/221; 152/226
[58] Field of Search ................ 152/208, 213 R, 213 A, 152/217, 221, 225 R, 225 C, 231, 232, 239, 241, 243; 81/15.8; 24/201 R, 201 HE, 265 H, 115 A

[56] References Cited
U.S. PATENT DOCUMENTS

| | | | |
|---|---|---|---|
| 1,340,182 | 5/1920 | Parker | 152/213 R |
| 1,788,857 | 1/1931 | Burkley | 152/221 |
| 1,963,939 | 6/1934 | Dodge | 152/221 |
| 2,204,783 | 6/1940 | Wettlaufer | 152/231 |
| 2,743,754 | 5/1956 | Maresh | 152/213 R |
| 3,837,049 | 9/1974 | Corrado | 24/201 R |
| 4,055,210 | 10/1977 | Mongault | 152/221 |

FOREIGN PATENT DOCUMENTS

587810 11/1933 Fed. Rep. of Germany ........... 152/221
780128 1/1935 France ................................ 24/201 HE Primary Examiner—Joseph F. Peters, Jr.
Assistant Examiner—D. W. Underwood
Attorney, Agent, or Firm—Frank J. Jordan

[57] ABSTRACT

An improved tire-slip preventing device consisting of a plurality of cross belts arranged across a pair of parallel cords in the form of a ladder is constructed so that one end of every other cross belt can be detached from the associated cord. The detachable end of every other cross belt is attached to the associated cord after the device has been wrapped about the tire, whereby a very tight fit between the tire and the device can be easily obtained. The last cross belt at one end is made detachable or otherwise one of the cords is provided at an intermediate portion thereof with a separable link, thus permitting the device to be wrapped about the tire without raising the vehicle or driving it onto the device.

10 Claims, 17 Drawing Figures

DEVICE FOR PREVENTING TIRES FROM SLIPPING

BACKGROUND OF THE INVENTION

1. Field of the Invention

This invention relates to a tire-slip preventing device and more particularly to a tire-slip preventing device for preventing the tires of a car from slipping on an icy, snowy or muddy road.

2. Description of the Prior Art

Figure 1:
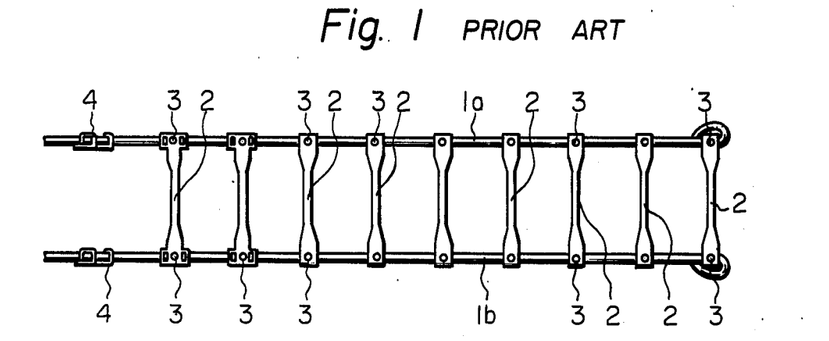
FIG. 1 is a plan view of a conventional tire-slip preventing device.

There has recently been proposed a tire-slip preventing device of the type shown in FIG. 1 which comprises two opposite and parallel cords 1a and 1b and a plurality of cross belts 2 molded of synthetic resin or some other tough but easily deformable material. In this conventional device, the cross belts are fixed to the cords at either end by rivets or some other fastening means so that when the device is laid out it has the form of a ladder. Each cord is provided with a pair of fastening means, one at either end of the ladder, to be linked with each other after the device has been wrapped about the tire.

This tire-slip preventing device has numerous advantages over the old tire chain made of metal. It is light, easy to carry and rust proof. Furthermore, it has the merit of causing much less damage to both the tire on which it is used and the road surface over which the vehicle travels. Nevertheless, it has an important drawback in that it is difficult to fit tightly on the tire.

Figures 2, 3:
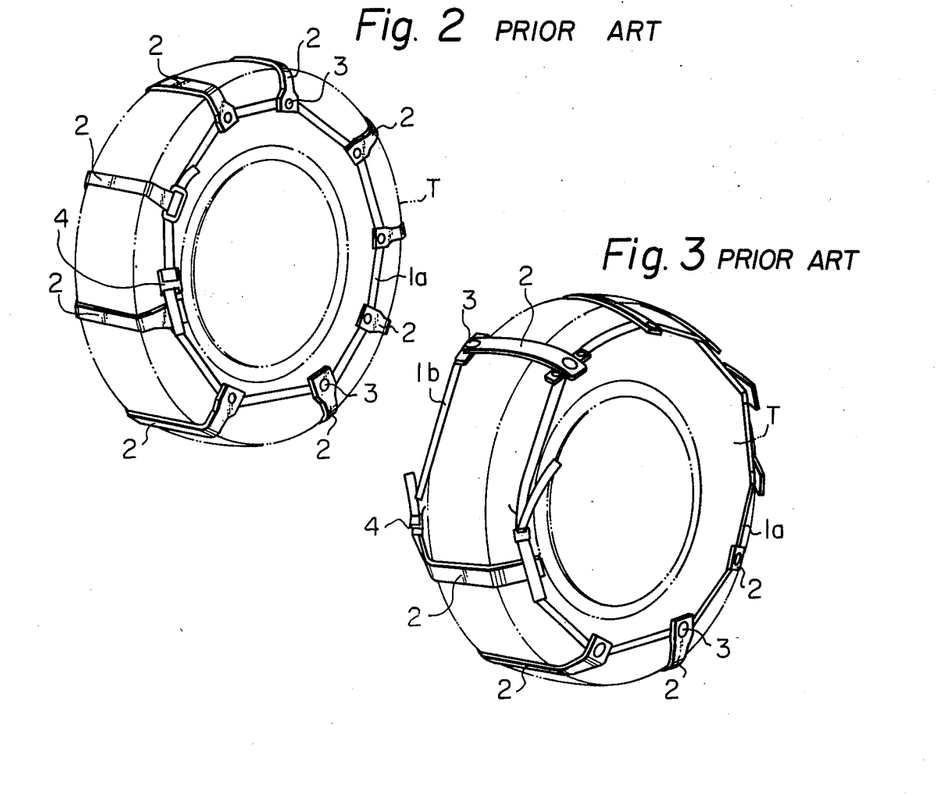
FIG. 2 is a perspective view of conventional tire-slip preventing device fitted on a tire in the ideal state.
FIG. 3 is a similar view of the conventional slip-preventing device fitted on a tire in the best state that can be attained in ordinary practice.
Figure 4:
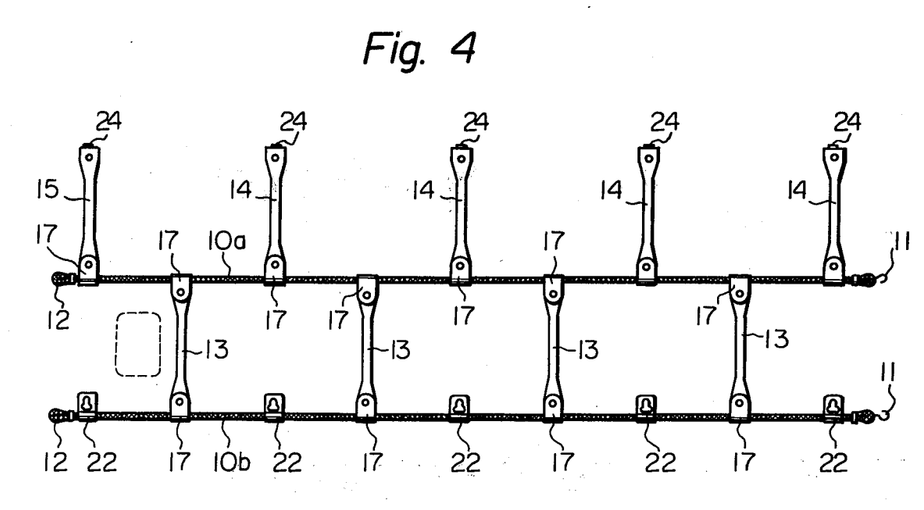
FIG. 4 is a plan view of a first embodiment according to this invention.

The device is designed to fit snugly on a tire T in the ideal state depicted in FIG. 2. That is, the length of the cross belts (the width of the device), their spacing on the cords and the position of the fastening means are selected so that when the cords are drawn fully taut, they will draw the projecting ends of the cross belts down onto the side walls of the tire in a state where the cross belts are evenly spaced about the tire surface. In actual use, however, it is extremely difficult to attach the device to a tire in this state, particularly if the tire is attached to a vehicle which prevents access to inward side of the tire. When the device is wrapped about the tire, the ends of the cross belts 2 tend to stick out to the sides because of their resilience as shown in FIG. 3. Theoretically, it is possible to make these protruding ends bend toward and lie flat on the side walls of the tire by shortening the effective length of the cords 1a and 1b. This requires an impractically large force, however, since it is necessary to overcome not only the resilient force of the cross belts but also the force of friction between the cross belts and the face of the tire and this latter force becomes progressively larger as the tightening operation proceeds. A person attaching the device by hand may not experience any severe difficulty in wrapping the ladder about the tire and linking the connecting metals 4 to obtain the degree of fit shown in FIG. 3. However, he will find it virtually impossible to attain the degree of fit shown in FIG. 2 merely by pulling at the opposite ends of the cords 1a and 1b. Consequently, although the conventional antislip device of this type works very well when attached to the tire in the ideal state, such a great amount of strength is required to attain this state that the device is in fact almost always used with cross belts spaced at somewhat irregular intervals and projecting from the edges of the tire. Furthermore, the conventional tire-slip preventing device can be attached to the tire only by raising the tire off the ground or by driving the tire of the vehicle onto the device.

SUMMARY OF THE INVENTION

In view of the defects of the conventional tire-slip preventing device mentioned above, the principal object of this invention is to provide a tire-slip preventing device which is easy to fit snugly on the circumference of a tire. Another object of this invention is to provide a tire-slip preventing device which makes it unnecessary to move the vehicle or jack up the car body in fitting the device on the tire, thus making it possible to simply and speedily complete the initial operation in fitting the slip-preventing device on the tire.

The above mentioned objects of the present invention are accomplished by the present invention in the manner summarized below.

The tire-slip device in accordance with the present invention is characterized in that every second of its cross belts is detachable from the associated cord at one end. Namely, all cross belts are fixedly attached to one of the two parallel cords while they are alternately detachably and fixedly attached to the other cord. In use, all detachable cross belts are detached at their one detachable end and the device is wrapped about the tire with the cord to which all cross belts are fixedly attached on the inside (the vehicle side). The ends of the respective cords are drawn together as tightly as possible and linked by some form of hooking means. At this time, the cord on either side forms a polygon the apexes of which are the points of attachment of those cross belts that are fixed to both cords. Next the free ends of the cross belts fixed at only one end are drawn over the tire face from behind and are hooked to hooking means provided on the cord on the outside of the tire at points which are mid-way between the apexes of the polygon. Thus when all detachable cross belts are attached, the number of sides of the polygon is greatly increased. As increasing the number of sides of a polygon tends to increase the length of its perimeter, the cords of fixed length pull inward (toward the center of the tire) on the ends of all cross belts causing them to bend and fit snugly against the side walls of the tire. As the cross belts are drawn over the face of the tire one at a time and in the direction of minimum frictional resistance, the tightening operation requires only moderate strength. In one embodiment of the tire-slip preventing device according to this invention, the last cross belt at one end is made detachable from one of the cords. With this arrangement, the device can be easily wrapped about the tire without need for jacking up the vehicle or driving it onto the device.

Various other objects, features and advantages of the present invention will become more apparent by reference to the following detailed description of preferred embodiments thereof taken in conjunction with the accompanying drawings as follows.

PREFERRED EMBODIMENTS OF THE INVENTION

Figures 5, 6:
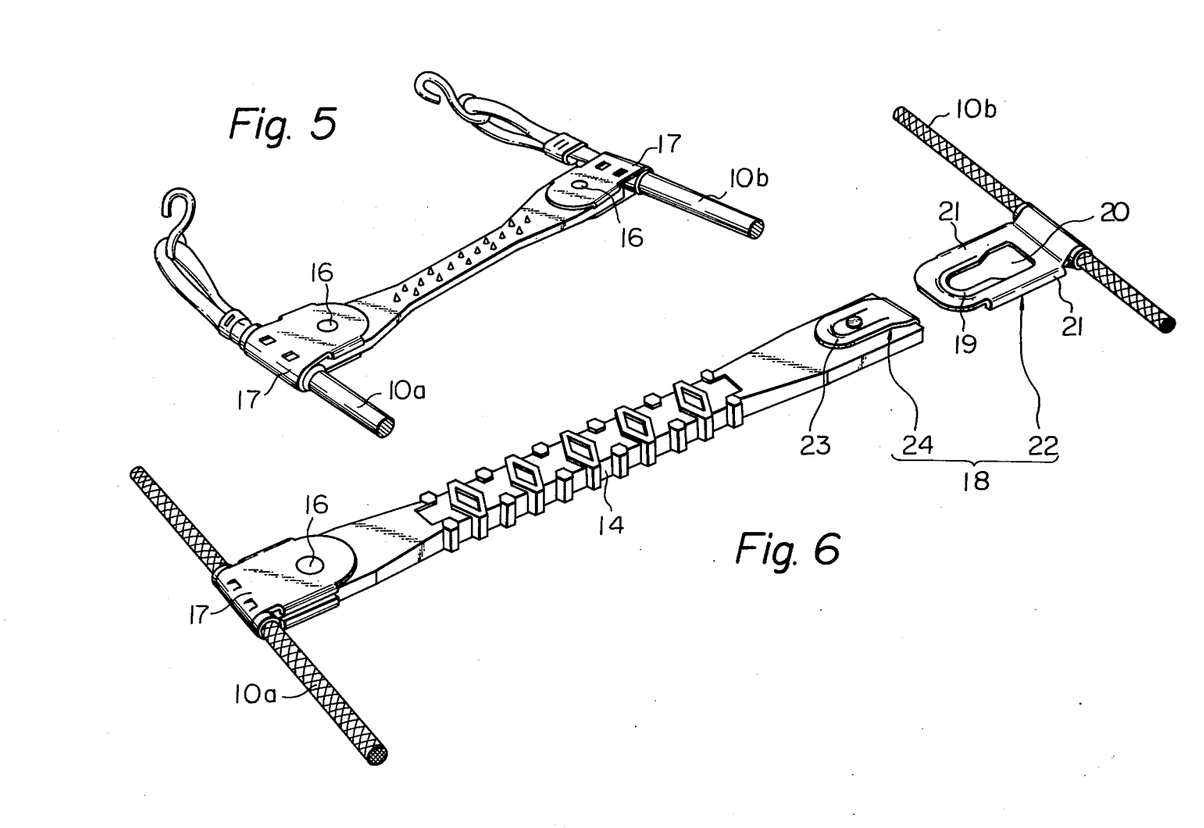
FIG. 5 is a perspective view of one portion of the first embodiment, showing a cross belt of the type fixedly attached to the cords at both ends.
FIG. 6 is similar view showing a cross belt of the type fixedly attached to the cord on one side and detachably fixed to the cord on the other side.
Figure 7:
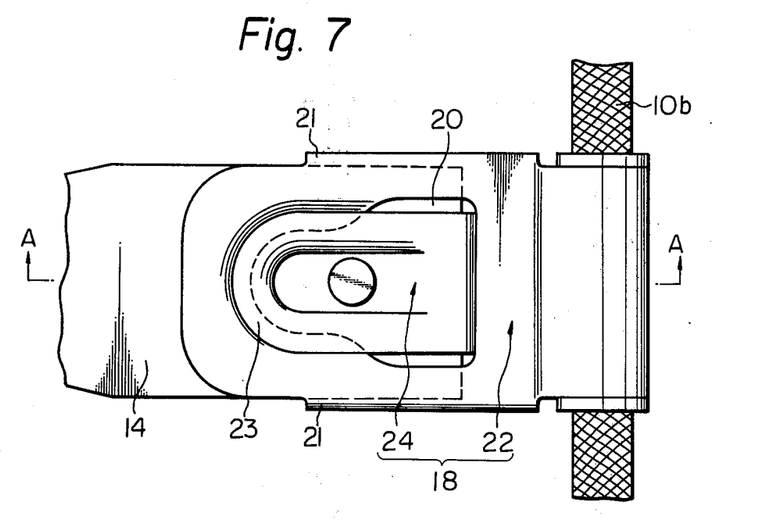
FIG. 7 is an enlarged view of a part of the cross belt of detachable type.
Figure 8:
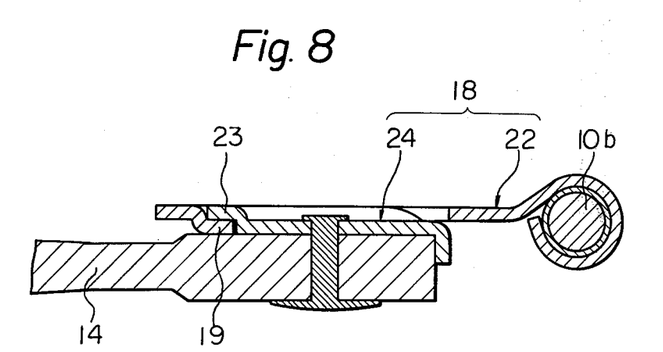
FIG. 8 is a sectional view of a part of the cross belt of detachable type taken along line "A—A" in FIG. 7, FIG. 9 and FIG. 10 show the first operation performed in fitting the tire-slip preventing device on a tire.

Referring to FIGS. 4 to 14, the tire-slip preventing device in accordance with a first embodiment of this invention comprises a pair of parallel cords 10a and 10b, each having a hook 11 and an eye 12 at opposite ends. These belts are provided with three types of cross belts 13, 14 and 15 all molded of synthetic resin or other strong, wear-resistant and yieldingly deformable material. The cross belt 13 has two U-shaped metals 17, one fixed at either end by a rivet 16 as best shown in FIG. 5. The cross belts 13 are fixed at either end to the opposite cords 10a and 10b by the U-shaped metals 17. The cross belts 14 have a U-shaped metal riveted to one end and a male metal 24 riveted to the other end. The cross belts 14 are permanently connected at one end to one cord 10a and are detachably connected at the other end to the other cord 10b, as is best shown in FIG. 6. The cross belts 13 and 14 are arranged alternately across the two cords in the form of a ladder, and these cross belts are (with the exception of one or at most a few cross belts in the vicinity of one end of the ladder—one in the embodiment shown) are arranged at regular intervals along the cords. The detachable end of each cross belt 14 is attached to the cord 10b by a coupling device 18 comprised of the male metal 24 at the end of the cross belt and a female metal 22 fixed on the cord 10b as is best shown in FIGS. 6 to 8. The female metal 22 has a depressed part 19 along a part of the circumference of an opening 20 therein and guide parts 21 along the opposite longitudinal sides of the metal. The female metal 22 is permanently connected to the cord 10b. The male metal, which will be described in detail below, is guided along the guide parts and is caught by the depressed part 19 of the opening of the female metal 22. The male metal 24 has a bent-back hook. This hook has a raised portion 23 along the outer periphery so as to fit in the depressed portion 19 of the female metal. The male metal 24 is integrally connected to the cross belt 14. With this arrangement the male and female metals 24 and 22 allow one end of the cross belt 14 to detachably engage with the cord 10b. One or at most a few cross belts 15 structurally identical to the cross belt 14 are provided in the vicinity of one end of the ladder. Specifically, one end of the cross belt 15 has a fixing metal 17 for fixing the cross belt to the cord 10a whereas the other end of the cross belt has a male metal 24 for fitting in an associated female metal 22 of the cord 10b, thus permitting the cross belt(s) 15 to detachably connect to the cord. Thus, the cross belts 15 are distinguished from the cross belts 14 only in that they are located at one end of the device and need not be arranged alternately with cross belts 13.

Figure 9:
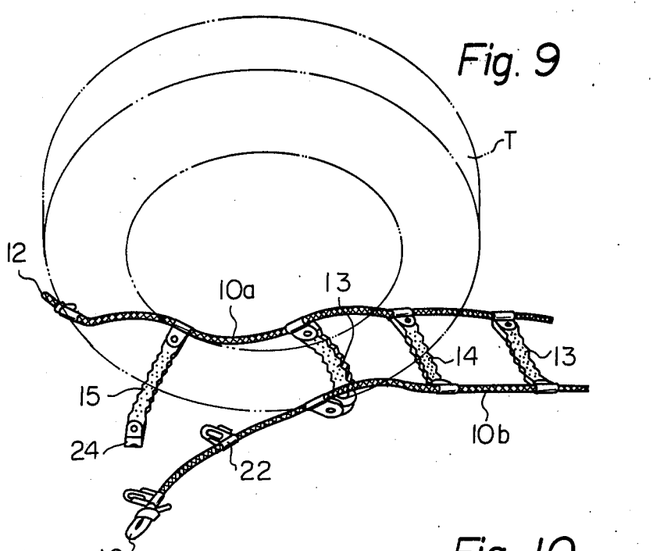
Figure 10:
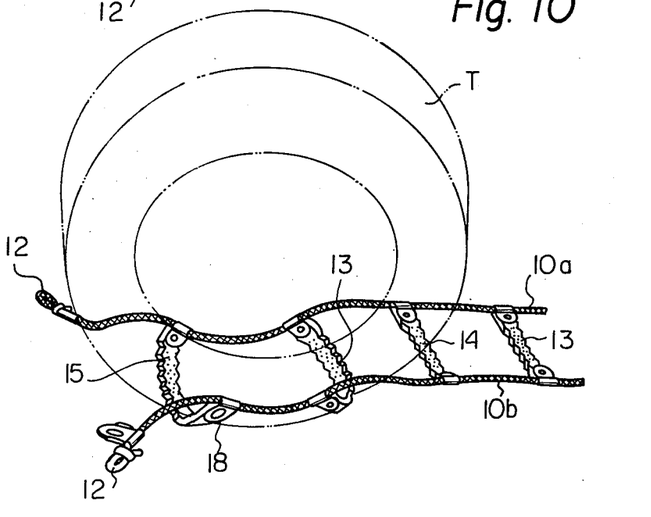

In fitting the tire-slip preventing device on a tire, the male metal 24 of the cross belt 15 at one end of the ladder is detached from the female metal 22 of the cord 10b so that said one end of the ladder is opened. Then, as shown in FIG. 9, the cross belt 15 and the end of the cord 10a to which it is attached are passed behind the tire T (from the point of view of a person facing the vehicle to which the tire is attached) and the corresponding end of the cord 10b is passed in front of the tire and the two cords are then pulled in the direction in which they were passed until the first cross belt 13 comes to and is stopped by the contact point between the tire T and the ground. The cross belt 15 can now be passed under the tire on the opposite side of the ground point and the male member 24 thereof can be fitted in the female metal 22. The result of this operation is as shown in FIG. 10 and is very similar to what would be attained by driving the tire of the vehicle onto the device except that the distance between the cross belt 15 and the adjacent cross belt 15 is somewhat more expanded and the cords connecting these two members are a little more taut. As is apparent from the above, the initial operation in fitting the tire-slip preventing device on the tire requires neither movement of the vehicle onto the device nor raising of the car body for creating a space between the tire and the ground to allow passage of the device thereunder.

Figure 11:
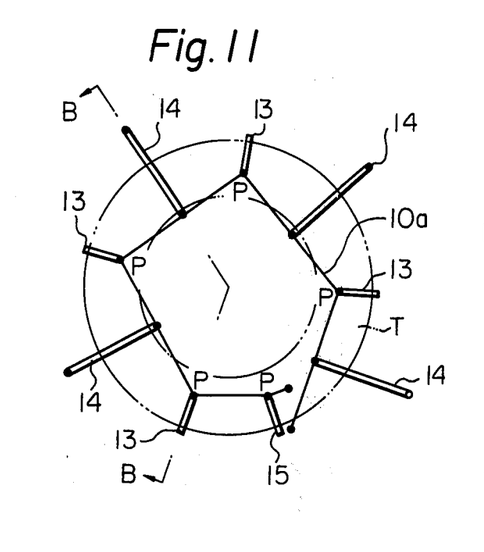
FIG. 11 shows one intermediate stage in the operation of fitting the tire-slip preventing device on a tire.
Figure 12:
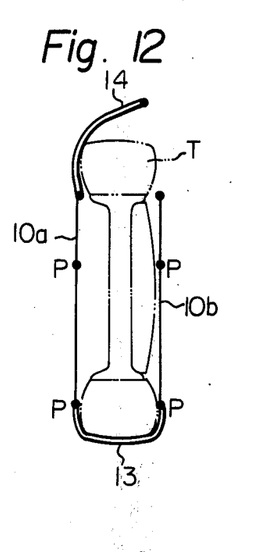
FIG. 12 is a sectional view taken along line "B—B" in FIG. 11.
Figure 13:
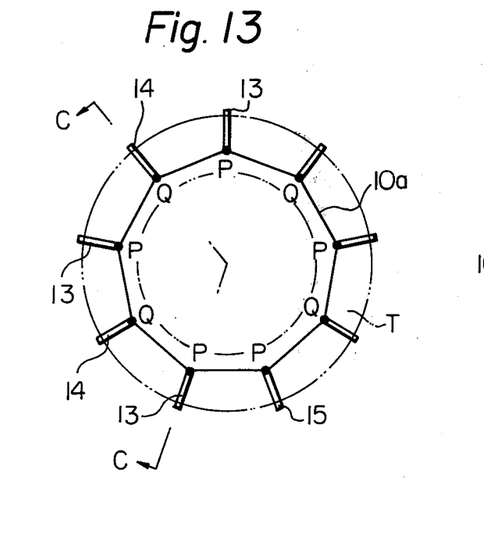
FIG. 13 shows the device in the state of being completely fitted on the tire.
Figure 14:
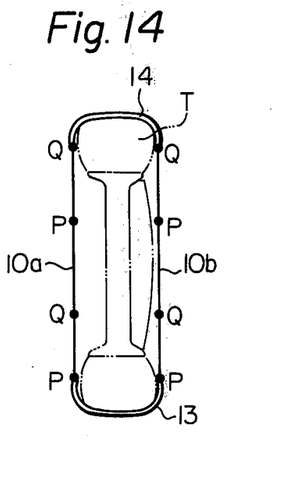
FIG. 14 is a sectional view taken along line "C—C" in FIG. 13, FIG. 15 a plan view of a second embodiment according to this invention.

All the cross belts 14 are detached from the cord 10b by disconnecting the male metals of the cross belts from the female metals of the cord. The whole length of the ladder is wrapped around the tire so that the cross belts 13 are arranged at proper intervals about the circumference of the tire as is best shown in FIG. 11. In this condition, the cords 10a and 10b are pulled radially only by the cross belts 13 and the cross belt(s) 15 at one end of the ladder. That is to say, the cross belts 14 do not exert any radial pull on the cords since they are detached at one end. Thus the number of points P at which the cords are radially pulled is less than the number of points at which they will be pulled after the tire-slip preventing device has been completely fitted on the tire in the condition shown in FIG. 13. When the device has been wrapped about the tire with the cross belts 14 detached as shown in FIG. 11, the cords 10a and 10b form polygons of many fewer sides than final polygon that will be formed when all cross belts are attached as shown in FIG. 13. As a consequence, a cord whose stretched length is chosen to be equal to the perimeter of the many-sided polygon shown in FIG. 13 will be of more than sufficient length to produce the polygon of relatively few sides shown in FIG. 11 and, therefore, it will be possible to connect the ends of the respective cords without the exertion of great force.

After the ladder has been wrapped around the tire and the ends of the cords have been hooked to each other, the cross belts 14 are pulled over the face of the tire one by one and are connected to the cord 10b by mating the male metals 24 of the cross belts with the female metals of the cord 10b. As a result of this operation, the cords 10a and 10b are pulled radially out at new points Q, and accordingly the cords are fully stretched and at the same time all the cross belts 13, 14 and 15 are arranged at regular intervals on the circumference of the tire, thus completing the fitting of the tire-slip preventing device on the tire.

Figure 15:
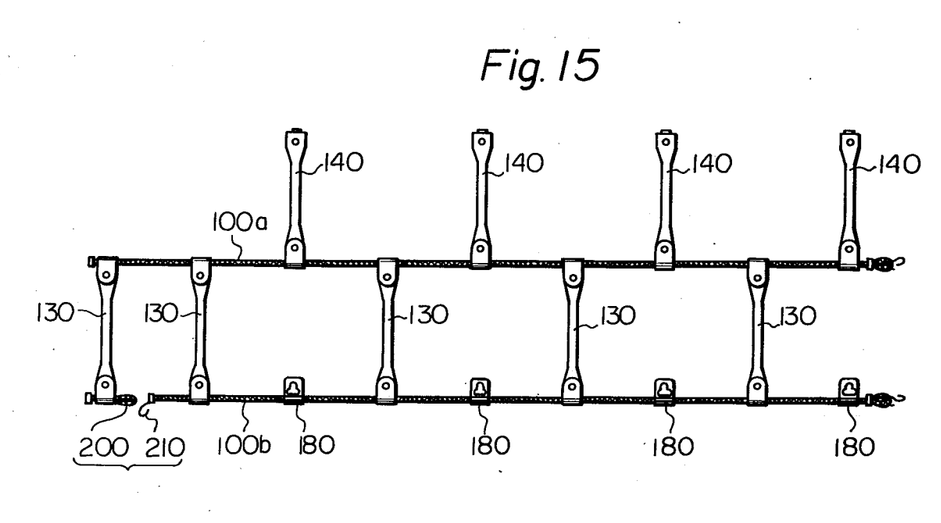
Figure 16:
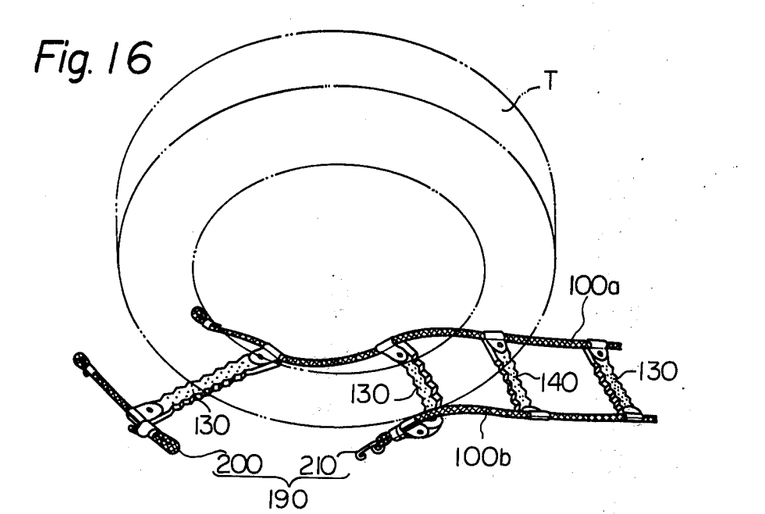
FIG. 16 is a perspective view of one part of the embodiment shown in FIG. 15 showing the first operation performed in fitting the device on a tire.
Figure 17:
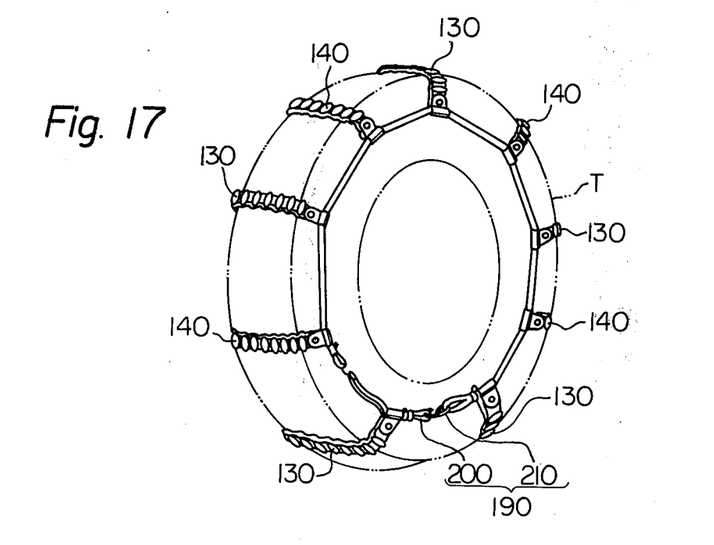
FIG. 17 shows the device in accordance with the second embodiment completely fitted on a tire.

Referring to FIGS. 15 to 17, there is shown a second embodiment according to this invention. As in the first embodiment, the cross belts of one type 130 are permanently connected at opposite ends to the parallel cords 100a and 100b, whereas the cross belts of the other type 140 are permanently connected at one end to cord 100a and are detachably connected at the other end to the cord 100b. These two types of cross belts are arranged alternately with each other. The second embodiment is different from the first embodiment in that one of the cords 100b in the second embodiment has a disconnecting part 190 at which the cord 100b can be disconnected or connected as required.

This disconnecting part 190 of the cord 100b is made in the form of a hook and an eye. The eye is made by bending one free end of the cord 100b in the form of a closed loop 200, and the hook 210 is fixed to the other free end of the cord. The open and free ends are connected by catching the hook in the eye.

In fitting the tire-slip preventing device of the second embodiment on the tire, the cord 100b is first disconnected by removing the hook 210 from the eye 200. Then as shown in FIG. 16, the device is laid on the ground behind (vehicle side of) the tire with the cord 100b nearer the tire and the disconnected portion of cord 100b in general alignment with the point at which the tire touches the ground. Next the device is pulled outward so as to cause the hook 210 to pass under the tire on one side of the point at which the tire touches the ground and the eye 200 to pass under the tire on the other side of said point. Then the hook 210 is caught by the eye so that the base of the tire is caught between two cross belts 130. As in the case of the first embodiment, fitting of the slip preventing device onto the tire does not entail any movement of the vehicle or any need to raise the car body. Subsequent operations in fitting the second embodiment completely onto the tire are precisely the same as those already described in respect of the first embodiment.

The manner and order in which the cross belts of the two types are arranged depends on the total number of cross belts desired and the space between them. The first and second embodiments of this invention described hereinbefore should not be understood to be limitative, and a variety of modifications are possible without departing from the spirit of this invention.

What I claimed is:

1. In a tire-slip preventing device having a plurality of cross belts arranged across two parallel cords in the form of a ladder, said cross belts being made of a yieldingly deformable and resilient material, first permanent connecting means permanently connecting some of said cross belts to said cords at both ends, second permanent connecting means permanently connecting the other cross belts at one end to one of said cords and detachable connecting means detachably connecting the other end to the other cord, said detachable connecting means comprising a male metal part and a female metal part, first attaching means attaching one of said metal parts to said other cord and second attaching means attaching the other of said metal parts to said other end of said cross belt, said female metal part having means defining an opening and said male metal part having a hook detachably fitting into said opening, said female metal part having a depressed portion along a section of the periphery of the opening, said hook of said male metal part having a raised portion along a peripheral section thereof, said depressed portion receiving said raised portion to detachably secure said hook in said opening.

2. In a tire-slip preventing device according to claim 1 wherein said male metal part is attached to said other end of said cross belt, said raised portion of said male metal part being spaced from a generally flat end portion of said other end of said cross belt, said depressed portion of said female metal part being fitted into said space between said raised portion of said male metal part and said generally flat end portion of said other end of said cross belt.

3. In a tire-slip preventing device according to claim 1 wherein said metal parts are provided with guide means to guide the raised portion into said depressed portion as the detachable connecting means is being connected.

4. In a tire-slip preventing device according to claim 3 wherein each of said metal parts has a generally flat section, the flat section of one of said metal parts having elongated spaced guides and the flat section of the other metal part having elongated spaced edges slidable between said spaced guides.

5. In a tire-slip preventing device according to claim 1 wherein said first and second attaching means permanently attach said metal parts to said other cord and to the other end of said cross belt.

6. In a tire-slip preventing device according to claim 5 wherein said second attaching means comprises a rivet permanently attaching said male metal part to said other end of said cross belt.

7. In a tire-slip preventing device according to claim 5 wherein said first attaching means comprises an elongated cylindrical portion on said female metal part in which said other cord is received, said female metal part having a generally planar portion extending generally perpendicularly from said other cord towards said one parallel cord, said cylindrical and planar portions being integrally formed.

8. In a tire slip preventing device according to claim 1 comprising intermediate cord disconnecting means for one of said cords disconnecting or connecting one of said cords at an intermediate disconnecting location when required.

9. A tire-slip preventing device according to claim 1 wherein said permanently connected cross belts and said detachably connected cross belts are arranged alternately.

10. A tire-slip preventing device according to claim 1 wherein said ladder has one end ending with at least one detachable cross belt.

* * * * *